United States Patent
Murata et al.

(10) Patent No.: US 10,029,327 B2
(45) Date of Patent: Jul. 24, 2018

(54) SOLDER BALL JET NOZZLE HAVING IMPROVED RELIABILITY

(71) Applicant: HGST Netherlands B.V., Amsterdam (NL)

(72) Inventors: Kenichi Murata, Ebina (JP); Yusuke Matsumoto, Fujisawa (JP); Yuichi Mori, Hiratsuka (JP); Eiki Oosawa, Odawara (JP); Tatsumi Tsuchiya, Ayase (JP); Tatsushi Yoshida, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 99 days.

(21) Appl. No.: 14/527,088

(22) Filed: Oct. 29, 2014

(65) Prior Publication Data
US 2016/0121416 A1    May 5, 2016

(51) Int. Cl.
*B23K 3/00* (2006.01)
*B23K 3/06* (2006.01)
(Continued)

(52) U.S. Cl.
CPC .......... *B23K 3/0623* (2013.01); *B23K 1/0016* (2013.01); *B23K 1/0056* (2013.01); *G11B 5/486* (2013.01); *G11B 5/4853* (2013.01)

(58) Field of Classification Search
CPC ............... B23K 1/0056; B23K 3/0623; B23K 26/1462; B23K 26/1464; H05K 2203/0195; H05K 3/3478; H05K 2203/082
See application file for complete search history.

(56) References Cited

U.S. PATENT DOCUMENTS 4,137,106 A * 1/1979 Doi ................. B21B 27/00
                                                      228/131
5,478,009 A * 12/1995 Interrante ......... B23K 1/018
                                                      225/1
(Continued)

FOREIGN PATENT DOCUMENTS

JP    2001-291951 A    10/2001
JP    2004-154801 A     6/2004

OTHER PUBLICATIONS

Georg Schlieper; Innovations in Powder Metallurgy at the PM2010 World Congress: Advances in Powder Production and Characterisation—Part 2; Powder Metallurgy Review; Nov. 9, 2010; 5 pages; IPMD Inovar Communications Ltd; Shrewsbury, UK; downloaded Apr. 16, 2014 at http://www.ipmd.net/articles/000981.html.
(Continued)

*Primary Examiner* — Erin B Saad
(74) *Attorney, Agent, or Firm* — John D. Henkhaus

(57) ABSTRACT

A solder ball bonding tool includes a nozzle having an inner bore having a plurality of columnar surfaces and interposed retention structures that are positioned within the nozzle to retain a solder ball therein. A projection or projected shape formed by intersecting the retention structures may be generally circular, having a diameter less than the diameter of the solder balls for which the retention structures are positioned to retain. The nozzle may comprise a cemented carbide having less than or equal to a cumulative 4.5% of cobalt and gold serving as a binder.

18 Claims, 5 Drawing Sheets

(51) Int. Cl.
*B23K 1/00* (2006.01)
*B23K 1/005* (2006.01)
*G11B 5/48* (2006.01)

(56) References Cited

U.S. PATENT DOCUMENTS

| | | |
|---|---|---|
| 6,336,581 B1 | 1/2002 | Tuchiya et al. |
| 6,543,677 B2 | 4/2003 | Pattanaik et al. |
| 6,831,252 B1 | 12/2004 | Crookshanks |
| 7,517,410 B2 | 4/2009 | Ono |
| 7,591,406 B2 | 9/2009 | Wagoh et al. |
| 7,717,316 B2 | 5/2010 | Azdasht et al. |
| 2004/0222206 A1 | 11/2004 | Nagase et al. |
| 2007/0075056 A1 | 4/2007 | Ho et al. |
| 2007/0228021 A1* | 10/2007 | Wagou ............ B23K 1/0056 219/121.63 |
| 2008/0179299 A1* | 7/2008 | Fukaya ............ B23K 1/0056 219/121.63 |
| 2010/0089981 A1 | 4/2010 | Matsumoto et al. |
| 2010/0243718 A1 | 9/2010 | Ciniglio et al. |
| 2011/0132879 A1 | 6/2011 | Matsumoto et al. |
| 2012/0248077 A1 | 10/2012 | Ho et al. |
| 2013/0256277 A1 | 10/2013 | Li et al. |
| 2013/0256281 A1 | 10/2013 | Tsuchiya et al. |

OTHER PUBLICATIONS

AP Nozzles; Products; 2012; 1 page; Pillarhouse International Limited; downloaded on Apr. 17, 2014 at http://www.pillarhouse.biz/wwwj/ap-nozzles.html.

Count on Tools Introduces Selective Soldering Nozzles for ACE Equipment; Press Release; Thomasnet News; May 27, 2010; 2 pages; Thomas Publishing Company; Gainesville, GA, USA; downloaded on Apr. 17, 2014 at http://news.thomasnet.com/companystory/Count-On-Tools-Introduces-Selective-Soldering-Nozzles-for-ACE-Equipment-578177.

Buatip Buasak; Waste Reduction in Hard Disk Drive Manufacturing by Improving Solder Jet Bonding Efficiency; KKU Res J (GS); Apr.-Jun. 2013; pp. 54-59; vol. 13 Issue 2.

* cited by examiner

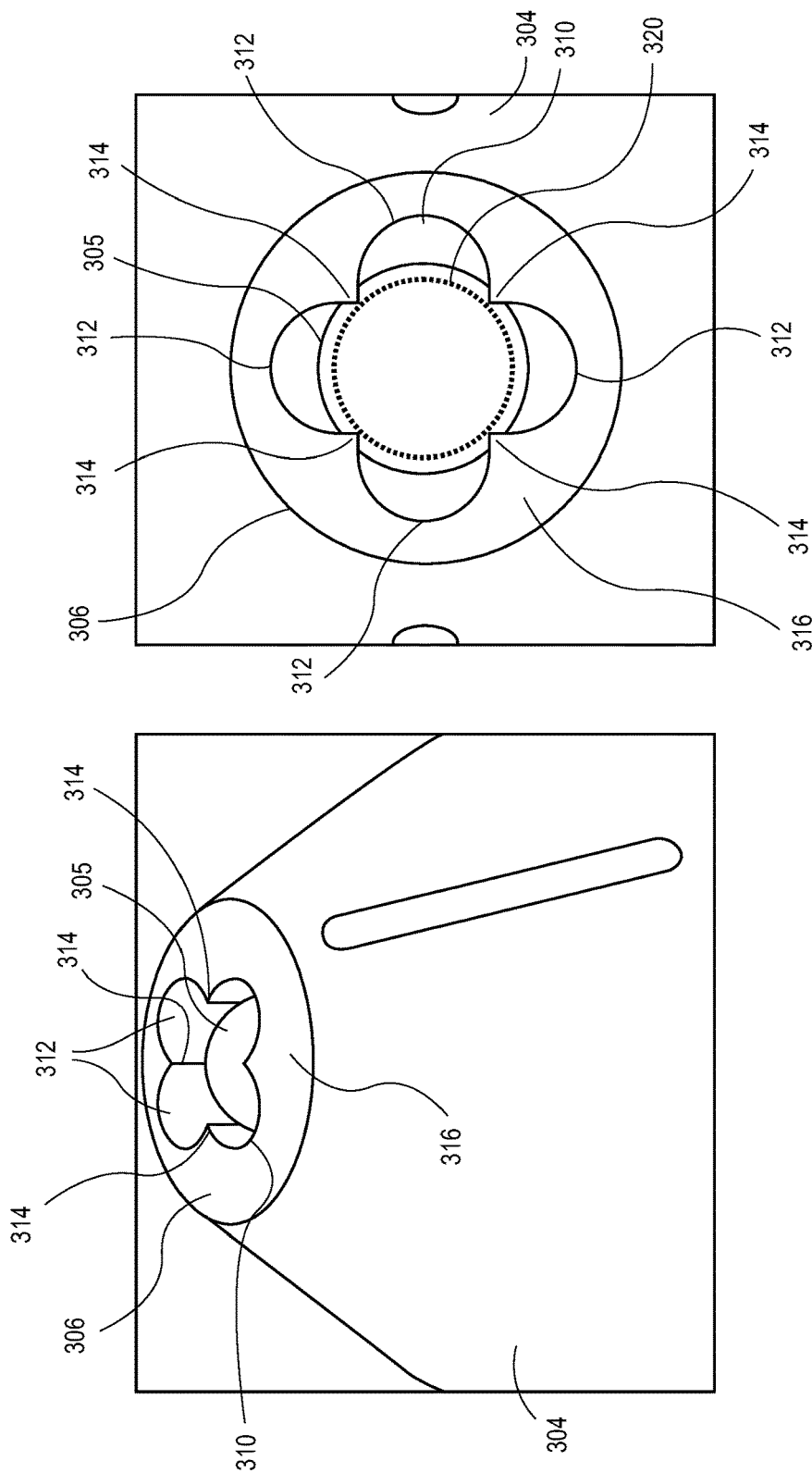

SOLDER BALL JET NOZZLE HAVING IMPROVED RELIABILITY

FIELD OF EMBODIMENTS

Embodiments of the invention may relate generally to manufacturing tooling and more particularly to an improved solder ball jet nozzle.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. A typical write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

An HDD includes at least one head gimbal assembly (HGA) that typically includes a read/write head integral to a head slider that is mounted on a flexure, a lead suspension attached to the head slider, and a load beam coupled with the flexure which together provide a gimbal function. Typically, the slider is electrically interconnected to the lead suspension via connection pads on the respective components, which are solder ball bonded (SBB) together to form the final electrical interconnection between the components.

One approach to the solder ball bonding procedure uses a tool, referred to as a solder ball jet (SBJ), for feeding and ejecting the solder ball onto a work piece being solder connected. An SBJ includes a nozzle (SBJ nozzle), and generally operates by detecting a solder ball inside the nozzle tip and irradiating the solder ball with a laser to make molten solder. The molten solder is then blown out of the nozzle through the nozzle tip with an inert gas (e.g., nitrogen), onto the bonding surfaces, such as the respective connection pads of the slider and the lead suspension, thereby electrically interconnecting the connection pads and thus the components. The inner diameter of a SBJ nozzle tip is typically smaller than the diameter of a corresponding solder ball, in order to hold the solder ball in place for irradiation and expulsion of the molten solder.

Based at least in part on the design and configuration of a given SBJ nozzle, the nozzle may be prone to suffer damage during operation, such as damage caused by the repeated thermal shock associated with the laser irradiation power on/off cycles and/or by operator error and mishandling.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a solder ball bonding (SBB) tool that includes a nozzle having an inner bore that has a plurality of columnar surfaces and interposed or interconnecting retention structures that are positioned within the nozzle to retain a solder ball therein. A projection or projected shape formed by intersecting the retention structures may be generally circular, having a diameter less than the diameter of the solder balls for which the retention structures are positioned to retain. Furthermore, the nozzle tip may comprise a continuous outer sidewall, whereby the columnar surfaces do not intersect the outer sidewall. Such a nozzle configuration is relatively stiff in comparison with prior designs and, therefore, is likely to be less prone to operational damage.

Embodiments include an SBB nozzle comprising a cemented carbide having less than or equal to around a cumulative 4.5% of cobalt and gold serving as a binder for the cemented carbide. Such a nozzle material composition has relatively less affinity for solder in comparison with prior designs and, therefore, is likely to be less prone to erosion by solder and corresponding damage.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3 is a perspective view illustrating an SBB nozzle, according to an embodiment;

FIG. 4 is a top plan view illustrating the SBB nozzle of FIG. 3, according to an embodiment;

DETAILED DESCRIPTION

Improvements to a solder ball bonding tool nozzle are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used for, but are not limited to, micro-soldering components of a hard-disk drive (HDD)

storage device. For a non-limiting example, embodiments may be used to electrically interconnect a head slider and a lead suspension for an HDD. Thus, in accordance with an embodiment, a plan view illustrating an HDD 100 is shown in FIG. 1 to illustrate an exemplary operating environment.

Figure 1:
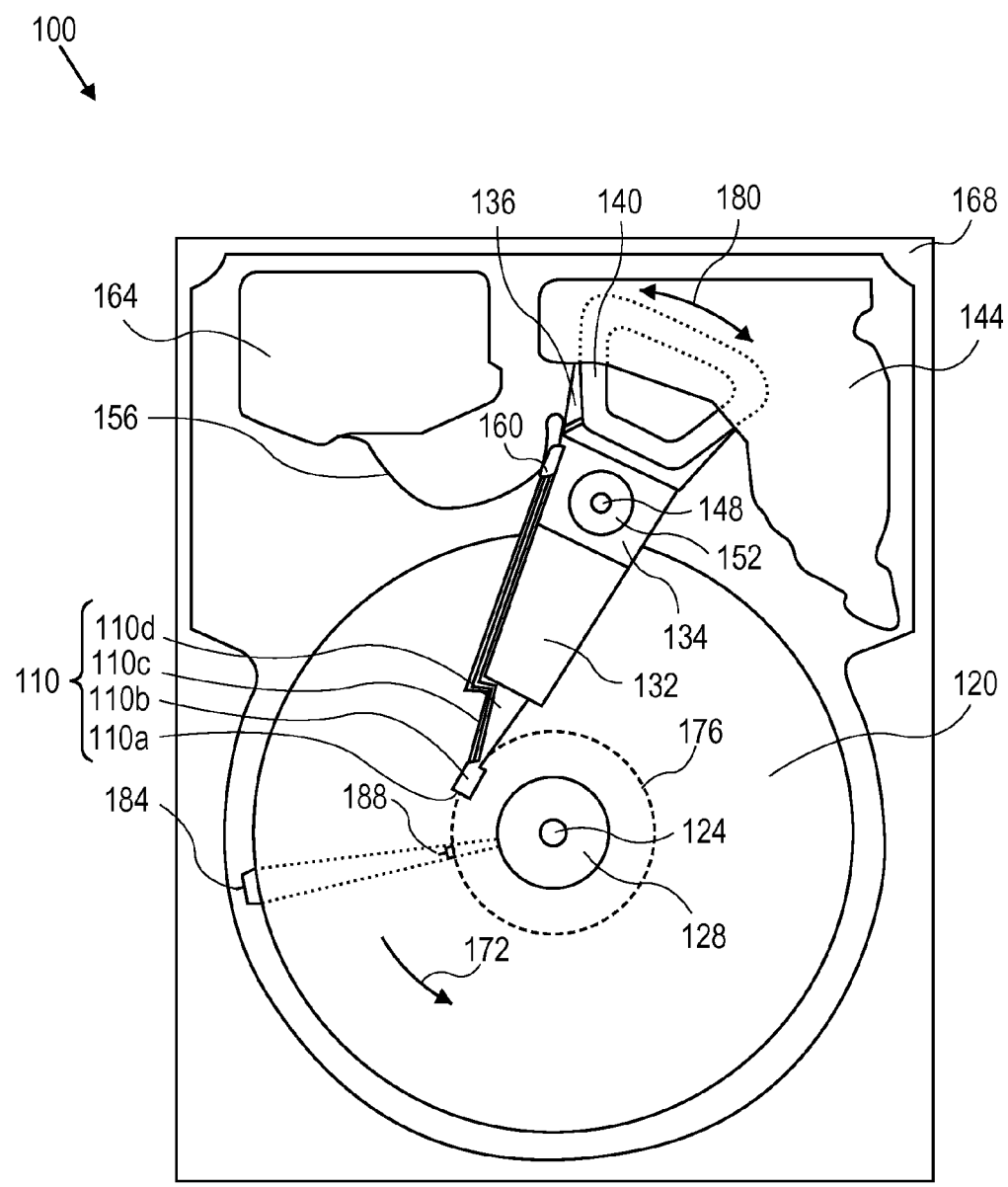
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

Known SBJ nozzle tips may have intersecting, and often perpendicular (e.g., a "+" or cross shape), grooves at the nozzle tip which, when viewed from the side, provide slits for solder ball detection within the nozzle. Such grooves typically extend to the outer surface of the SBJ nozzle and reduce the stiffness of the nozzle, which results in the nozzle being more prone to suffer damage during operation, such as damage caused by the repeated thermal shock associated with the laser irradiation power on/off cycles and/or by operator error and mishandling.

Furthermore, within the context of hard disk drives, the number of slider electrical connections and thus connection pads is expected to increase over time due to the implementation of new technologies, such as microwave-assisted magnetic recording (MAMR), heat-assisted magnetic recording (HAMR), and the like. Consequently, to make room for the additional connection pads the size of the pads and of the solder balls used to bond the slider to the suspension are expected to decrease accordingly. This in turn leads to the need for smaller nozzles and thus thinner nozzles near the tip, thereby exacerbating any fragility associated with the tool.

Still further, in an SBJ soldering process, the SBJ nozzle too often needs to be replaced when solder adheres to the nozzle tip and the nozzle tip is damaged. This solder adhesion nozzle tip damage shortens the useful operational life of the nozzle and, consequently, increases the cost associated with HDD production.

Because an SBJ nozzle can be an expensive tool, e.g., some are made from industrial ruby, a more durable nozzle could lengthen the life of the tool and therefore reduce running operational costs.

Solder Ball Bonding Tool

Figure 2:
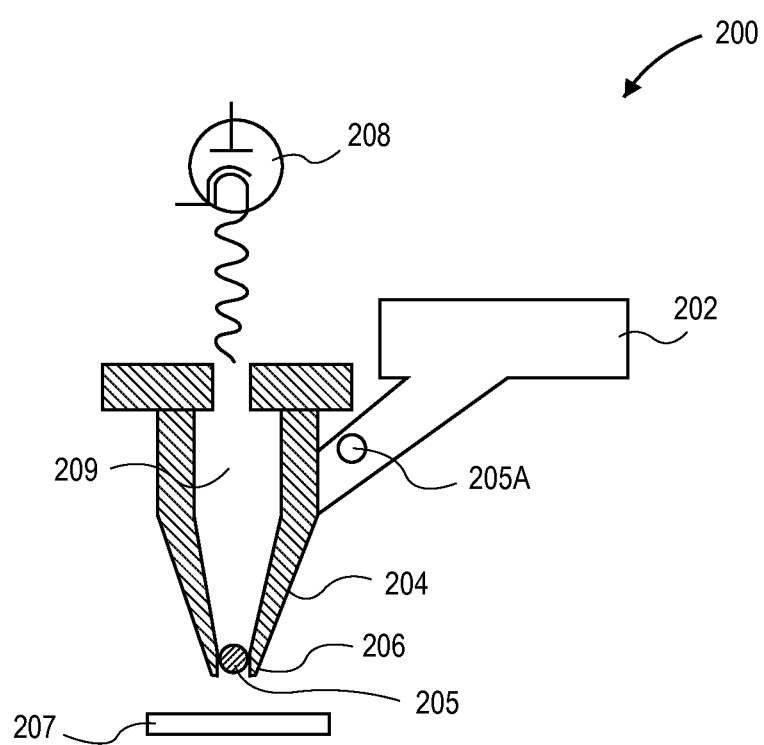
FIG. 2 is a schematic diagram illustrating a solder ball bonding (SBB) tool, according to an embodiment.

FIG. 2 is a schematic diagram illustrating a solder ball bonding (SBB) tool, according to an embodiment. The solder ball jet (SBJ) 200 illustrated in FIG. 2 is used for feeding and ejecting a solder ball 205 onto a work piece 207 being solder connected. A solder ball reservoir 202 stores and feeds solder balls such as solder ball 205a into a nozzle 204, where pressure is applied to the solder ball by a compressed gas as the solder ball is falling into the nozzle 204 or after the solder ball is held at the nozzle tip 206. Laser light from laser 208 irradiates the solder ball through a laser optical path 209 to at least partially melt the solder ball 205 ("molten solder"), which is ejected or expelled out of the nozzle 204 through the nozzle tip 206 by operation of the compressed gas and onto the work piece 207.

FIG. 3 is a perspective view illustrating an SBB nozzle, and FIG. 4 is a top plan view illustrating the SBB nozzle of FIG. 3, according to an embodiment. Nozzle 304 comprises an inner bore 310 and a nozzle tip 306. According to an embodiment the nozzle tip 306 comprises a continuous or unbroken outermost interface (e.g., where nozzle tip 306 meets the main body of the nozzle 304) of outer sidewall 316, which may be formed in a spherical or truncated conical shape in the axial direction of nozzle 304, for non-limiting examples. The inner bore 310 of nozzle 304 comprises a plurality of columnar surfaces 312 (a non-limiting four columnar surface(s) 312 depicted in FIGS. 3, 4), which are interposed or interrupted by a respective retention structure 314, each and collectively positioned to retain a solder ball 305 within the nozzle 304. According to an embodiment, each respective pair of columnar surfaces 312 is interposed by a respective retention structure 314.

As illustrated in FIG. 4, an imaginary or virtual or projected shape 320 (depicted with dashes), "formed" or projected by intersecting the retention structures 314, is substantially circular-shaped. Shape 320 has a diameter that is less than the diameter of a solder ball (e.g., solder ball 305) for which the retention structures are positioned to retain, thereby functioning to retain the solid solder ball. Once the solder ball 305 is irradiated to form a semi-melted or molten solder, such as by laser 208 (FIG. 2), then the semi-melted solder ball 305 is able to change shape for expulsion out of the nozzle 304 through the nozzle tip 306 in response to the force of a pressurized gas.

From the top plan view of FIG. 4, it can be seen that the plurality of columnar surfaces 312 of inner bore 310 do not intersect the outermost interface of outer sidewall 316, i.e., where outer sidewall 316 of nozzle tip 306 meets the main body of nozzle 304. In view of the continuity of the outermost interface of outer sidewall 316 of nozzle tip 306, a more robust nozzle tip is provided than with those SBJ nozzle tips that have intersecting, cross-shaped grooves at the nozzle tip.

Figure 5A:
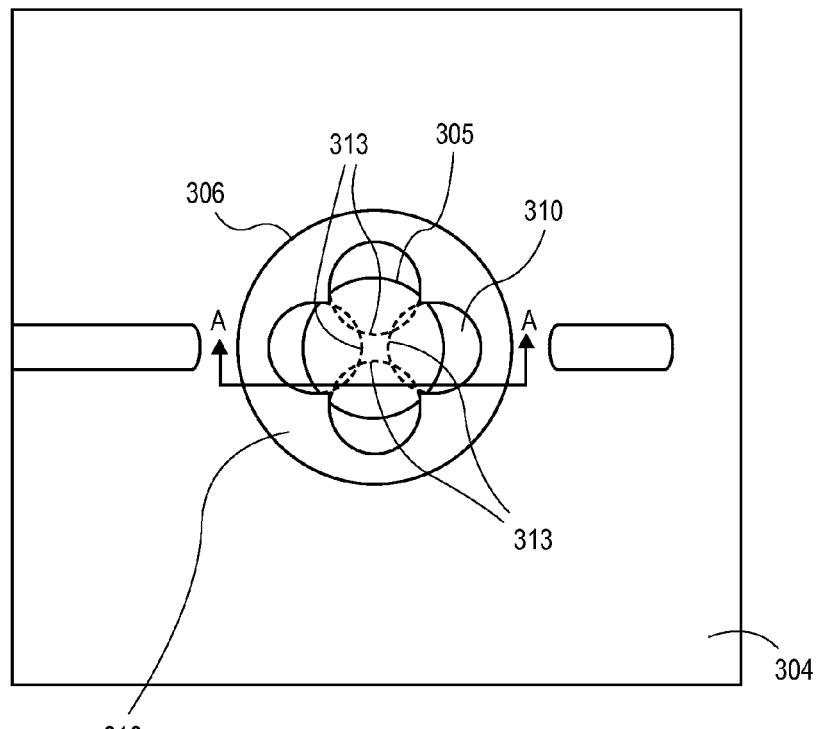
FIG. 5A is a top plan view illustrating the formation of the SBB nozzle of FIG. 3, according to an embodiment.

FIG. 5A is a top plan view illustrating the formation of the SBB nozzle of FIG. 3, according to an embodiment. FIG. 5A again depicts nozzle 304 having nozzle tip 306, in which a solder ball 305 is retained. As can be recognized from FIGS. 3-5B, and according to an embodiment, each columnar surface 312 of the inner bore 310 are concave surfaces. In reference to FIG. 5A, one can visualize that the columnar surfaces 312 of inner bore 310 resemble circular holes 313 formed by piles (i.e., long slender columns), where the diameter of each circular hole 313 is less than the diameter of a solder ball 305 for which the retention structures 314 (FIGS. 3, 4, 5B) are positioned to retain. This is not to suggest that the inner bore 310 and each corresponding columnar surface 312 and retention structure 314 are actually fabricated by driving piles into nozzle 304, but is merely suggested for visualization purposes. Rather, for purposes of example and according to a non-limiting embodiment, a laser ablation process may be used to fabricate nozzle tip 306. Not only does laser processing enable achieving high fabrication accuracy (e.g., +/−1 μm) in comparison with conventional machining, but also in a relatively short fabrication time thereby enabling the possibility of reduced fabrication cost.

Figure 5B:
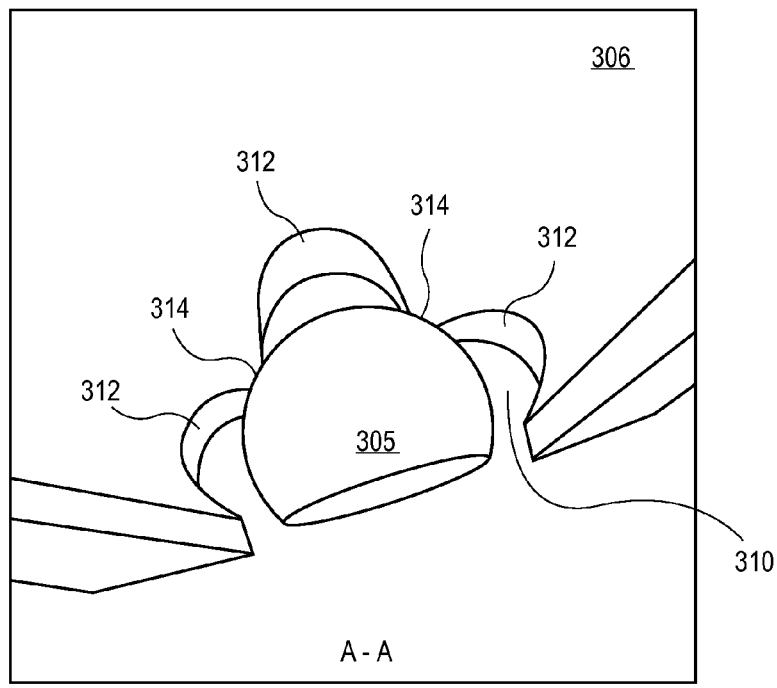
FIG. 5B is a cut-away perspective view further illustrating the SBB nozzle of FIG. 5A, according to an embodiment.

FIG. 5B is a cut-away perspective view A-A further illustrating the SBB nozzle of FIG. 5A, according to an embodiment. FIG. 5B provides further perspective of a plurality of columnar surfaces 312 and associated retention structures 314 of the inner bore 310 of the nozzle tip 306, and a manner in which such supporting structures are positioned and configured to retain a solder ball 305 prior to expulsion from the nozzle tip 306. Note also that as four columnar surfaces 312 and four retention structures 314 have been used throughout for purposes of example, the number of columnar surfaces and associated retaining structures fabricated for a SBJ nozzle and nozzle tip may vary from implementation to implementation. While research associated with a nozzle tip configuration having four of such columnar surfaces and retention structures has shown to be effective at providing a stiffer and less damage-prone nozzle tip structure, an embodiment having three or more columnar surfaces and corresponding retention structures and an embodiment having at least four of such columnar surfaces and corresponding retention structures are considered to lie within the scope of the broader teachings provided herein.

Solder Ball Bonding Nozzle Material Composition

As mentioned, the SBJ nozzle too often needs to be replaced when solder adheres to the nozzle tip and the nozzle tip is damaged. SBJ nozzles are commonly fabricated from cemented carbide, which is considered a hard and highly durable material, especially in the context of high-volume manufacturing. Cemented carbides are composed of a metal matrix composite of carbide particles, a carbon-based compound, and a metallic binder serving as the matrix, where the process of combining the carbide particles with the binder is referred to as sintering. According to an embodiment, one type of cemented carbide that may be used in the fabrication of SBJ nozzles is tungsten carbide, comprising tungsten carbide grains combined with a metal binder. For example and according to an embodiment, a binder used to fabricate an SBJ nozzle comprises cobalt (Co) and gold (Au).

Adhesion of solder to the nozzle tip occurs at least in part because molten solder adheres to exposed binder. Adhesion of solder to the nozzle is more likely to occur when the binder has an affinity for solder. Furthermore, damage of the nozzle tip occurs because a binder with an affinity for solder is eroded by solder and therefore the strength of the binder decreases. Therefore, reducing the binder's affinity for solder is desirable to achieve a reliable SBJ nozzle having a desirably long operational life.

A binder's affinity for solder is affected by the material composition of the binder. Varying the percentages of cobalt and gold used as binder to fabricate a cemented carbide nozzle, and their affect on the reliability of the nozzle based on the nozzle's resistance to damage, presented the following non-limiting observations. Using a cumulative percentage of around 8.31% (e.g., 1.61% Co and 6.7% Au) resulted in cracks in the nozzle, primarily associated with the Au layer. Using a cumulative percentage of around 6.0% (e.g., 6.0% Co and 0% Au) resulted in no damage to any particular layer, however, significant solder residue was observed on the inner surface of the nozzle. Further, acicular crystal formations of Co were also observed and considered a contributing factor. Using a cumulative percentage of around 2.4% (e.g., 2.4% Co and 0% Au) resulted in no damage to any particular layer and less solder residue than was observed on the inner surface of the nozzle when using 6.0% Co.

According to an embodiment, the cumulative percentage of cobalt and gold used in a cemented carbide binder for a nozzle is less than or equal to about 4.5%. The lower limit of the cumulative percentage of cobalt and gold used in a cemented carbide binder may be defined based on the sintering conditions and technology. Stated otherwise, the lower limit of the content rate may be defined as the minimal quantities of cobalt and gold that can be used to form sintered nozzles using any given sintering process.

Manufacturing a Magnetic Recording Assembly

Figure 6:
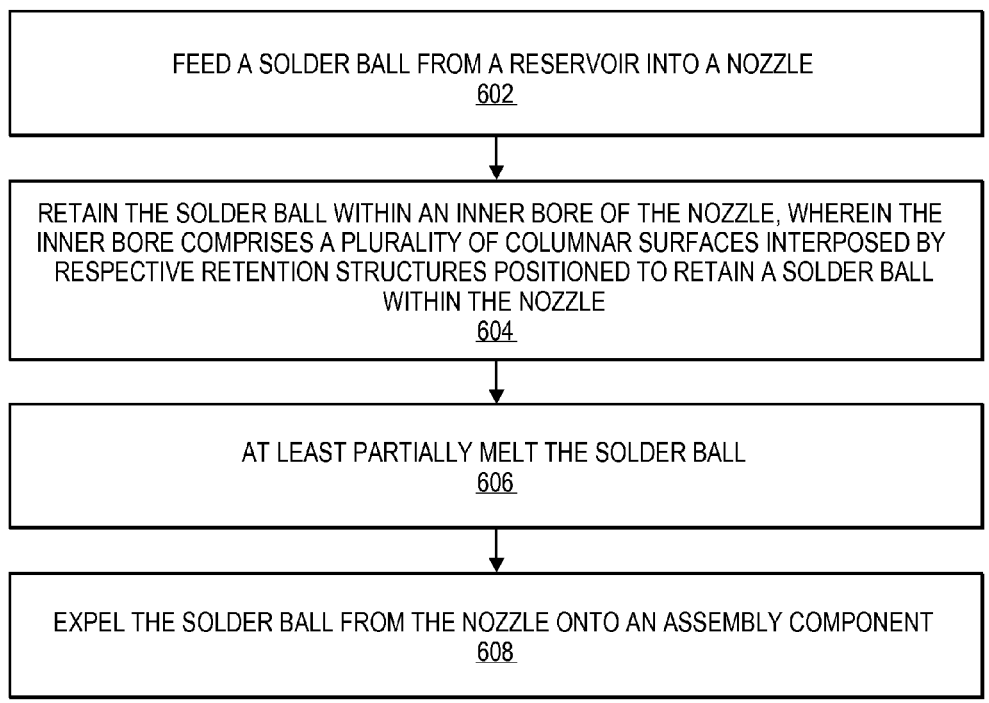
FIG. 6 is a flow diagram illustrating a method of manufacturing a magnetic recording assembly, according to an embodiment.

FIG. 6 is a flow diagram illustrating a method of manufacturing a magnetic recording assembly, according to an embodiment.

At block 602, a solder ball is fed from a reservoir into a nozzle. For example, solder ball 205a (FIG. 2) is fed from solder ball reservoir 202 (FIG. 2) into nozzle 204 (FIG. 2).

At block 604, the solder ball is retained within an inner bore of the nozzle, wherein the inner bore comprises a plurality of columnar surfaces interposed by respective retention structures positioned to retain a solder ball within the nozzle. For example, solder ball 205 (FIG. 2) is retained within the inner bore 310 of the nozzle 304 (see, e.g., FIGS. 3-4), where inner bore 310 comprises a plurality of columnar surfaces 312 interposed by respective retention structures 314 (see, e.g., FIGS. 3-4).

At block 606, the solder ball is at least partially melted. For example, solder ball 205 (FIG. 2) is partially melted by way of irradiation from laser 208 (FIG. 2).

At block 608, the solder ball is expelled from the nozzle onto an assembly component. For example, partially melted solder ball 205 (FIG. 2) is expelled from the nozzle tip 206 (FIG. 2) onto a work piece 207 (FIG. 2). According to an embodiment, the partially melted solder ball is expelled onto respective electrical contact pads of a magnetic recording head slider (see, e.g., slider 110b of FIG. 1) and a suspension (see, e.g., lead suspension 110c of FIG. 1), for use in a hard disk drive.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:
1. A solder ball bonding tool nozzle, comprising:
an inner bore comprising a plurality of equivalent columnar surfaces equally spaced around the perimeter of said inner bore; and
a plurality of retention structures each formed by an intersection of two said adjacent columnar surfaces such that only one pointes structure per retention structure extends into said inner bore in a position to retain a solder ball within said nozzle;
wherein said nozzle is composed of a cemented carbide having up to a 4.5% cumulative percentage of cobalt and gold serving as a binder.
2. The nozzle of claim 1, wherein a projected shape formed by intersecting said retention structures is substan- tially circular and has a diameter that is less than the diameter of a solder ball for which said retention structures are positioned to retain.

3. The nozzle of claim 1, wherein said columnar surfaces of said inner bore are concave surfaces.

4. The nozzle of claim 1, wherein said columnar surfaces of said inner bore are substantially circular concave surfaces having a diameter that is less than the diameter of a solder ball for which said retention structures are positioned to retain.

5. The nozzle of claim 1, further comprising a nozzle tip comprising a continuous outer side wall, and wherein said columnar surfaces of said inner bore do not intersect an outermost interface of said outer sidewall of said nozzle tip.

6. The nozzle of claim 1, wherein said plurality of columnar surfaces comprises three or more columnar surfaces and wherein said plurality of retention structures comprises three or more retention structures.

7. The nozzle of claim 1, wherein said plurality of columnar surfaces comprises at least four columnar surfaces and wherein said plurality of retention structures comprises at least four retention structures.

8. A solder ball bonding tool, comprising:
a solder ball reservoir configured for housing a plurality of solder balls;
a nozzle configured for retaining at least one solder ball from said reservoir, said nozzle comprising:
an inner bore comprising a plurality of equivalent columnar surfaces equally spaced around the perimeter of said inner bore, and
a plurality of retention structures each formed by an intersection of two said adjacent columnar surfaces such that only one pointed structure per retention structure extends into said inner bore in a position to retain said at least one solder ball within said nozzle, wherein said nozzle is composed of a cemented carbide having up to a 4.5% cumulative percentage of cobalt and gold serving as a binder; and
a laser light source for at least partially melting said solder ball for the expulsion of said partially melted solder ball from said nozzle.

9. The solder ball bonding tool of claim 8, wherein a projected shape formed by intersecting said retention structures of said inner bore is substantially circular and has a diameter that is less than the diameter of said at least one solder ball.

10. The solder ball bonding tool of claim 8, wherein said columnar surfaces of said inner bore are concave surfaces.

11. The solder ball bonding tool of claim 8, wherein said columnar surfaces of said inner bore are substantially circular concave surfaces having a diameter that is less than the diameter of said at least one solder ball.

12. The solder ball bonding tool of claim 8, further comprising a nozzle tip comprising a continuous outer side wall, and wherein said columnar surfaces of said inner bore do not intersect an outermost interface of said outer sidewall of said nozzle tip.

13. The solder ball bonding tool of claim 8, wherein said plurality of columnar surfaces comprises three or more columnar surfaces and wherein said plurality of retention structures comprises three or more retention structures.

14. The solder ball bonding tool of claim 8, wherein said plurality of columnar surfaces comprises at least four columnar surfaces and wherein said plurality of retention structures comprises at least four retention structures.

15. A method comprising:
feeding a solder ball from a reservoir into a nozzle composed of a cemented carbide having up to a 4.5% cumulative percentage of cobalt and gold serving as a binder;
retaining said solder ball within an inner bore of said nozzle, wherein said inner bore comprises a plurality of equivalent columnar surfaces equally spaced around the perimeter of said inner bore, and wherein said nozzle comprises a plurality of retention structures each formed by an intersection of two said adjacent columnar surfaces and such that only one pointed structure per retention structure extends into said inner bore in a position to retain a solder ball within said nozzle;
at least partially melting said solder ball; and
expelling said solder ball from said nozzle onto an assembly component.

16. The method of claim 15, wherein said expelling includes expelling said partially melted solder ball onto respective electrical contact pads of a magnetic recording head slider and a suspension.

17. A solder ball bonding tool nozzle, comprising:
an inner bore comprising a plurality of equivalent columnar surfaces equally spaced around the perimeter of said inner bore; and
a plurality of retention structures each formed by an intersection of two said adjacent columnar surfaces such that only one pointed structure per retention structure extends into said inner bore in a position to retain a solder ball within said nozzle.

18. A solder ball bonding tool, comprising:
a solder ball reservoir configured for housing a plurality of solder balls;
a nozzle configured for retaining at least one solder ball from said reservoir, said nozzle comprising;
an inner bore comprising a plurality of equivalent columnar surfaces equally spaced around the perimeter of said inner bore, and
a plurality of retention structures each formed by an intersection of two said adjacent columnar surfaces such that only one pointed structure per retention structure extends into said inner bore; and
a laser light source for at least partially melting said solder ball for the expulsion of said partially melted solder ball from said nozzle.

\* \* \* \* \*